United States Patent [19]

Myers et al.

[11] Patent Number: 5,653,256
[45] Date of Patent: Aug. 5, 1997

[54] CHARGE VALVE ASSEMBLY

[75] Inventors: John Myers, Milford; John Rogers, Clarkston, both of Mich.

[73] Assignee: Nissan Research & Development, Inc., Farmington Hills, Mich.

[21] Appl. No.: 535,743

[22] Filed: Sep. 28, 1995

[51] Int. Cl.[6] .................................................. F16K 15/02
[52] U.S. Cl. ....................... 137/454.2; 62/292; 137/234.5
[58] Field of Search ........................ 62/292; 137/454.2, 137/454.5, 454.6, 234.5

[56] References Cited

U.S. PATENT DOCUMENTS

| | | | |
|---|---|---|---|
| 3,336,936 | 8/1967 | Mullins | 137/234.5 |
| 3,347,266 | 10/1967 | Hansen | 137/454.2 X |
| 4,664,153 | 5/1987 | Bishop | 137/798 |
| 4,753,267 | 6/1988 | Starr et al. | 137/234.5 X |
| 4,819,685 | 4/1989 | Pagani | 137/223 |
| 5,033,498 | 7/1991 | Brandt | 137/223 |
| 5,205,531 | 4/1993 | Kolchinsky | 251/30.04 |
| 5,582,201 | 12/1996 | Lee et al. | 137/454.2 |

*Primary Examiner*—Stephen M. Hepperle
*Attorney, Agent, or Firm*—Brooks & Kushman P.C.

[57] ABSTRACT

A simplified fluid pressure charge valve assembly for a pressurized mechanical refrigeration system that may be assembled to a housing portion for an automotive air conditioning system including a unitary valve stem adapted to be secured to the housing and having an internal chamber for receiving a cartridge-type valve wherein the cartridge-type valve is secured in place in the valve stem cavity and sealed against internal walls of the valve stem without the necessity for providing internal threads in the valve stem, thereby reducing variable costs in the manufacture of the assembly and simplifying assembly procedure.

8 Claims, 2 Drawing Sheets

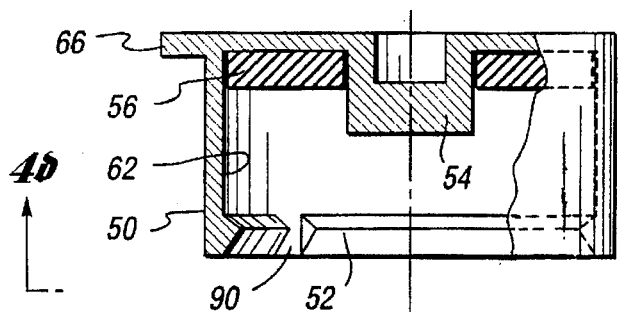
Fig. 4a
Fig. 3b
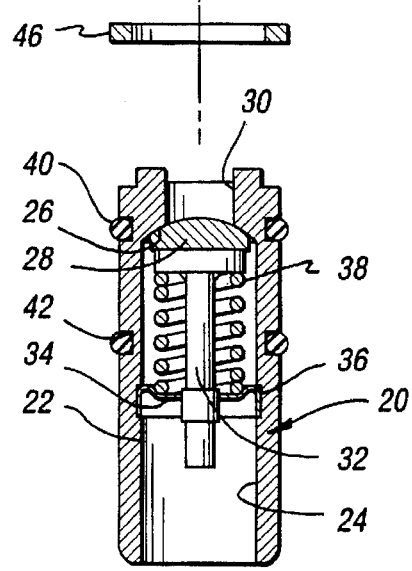
Fig. 2
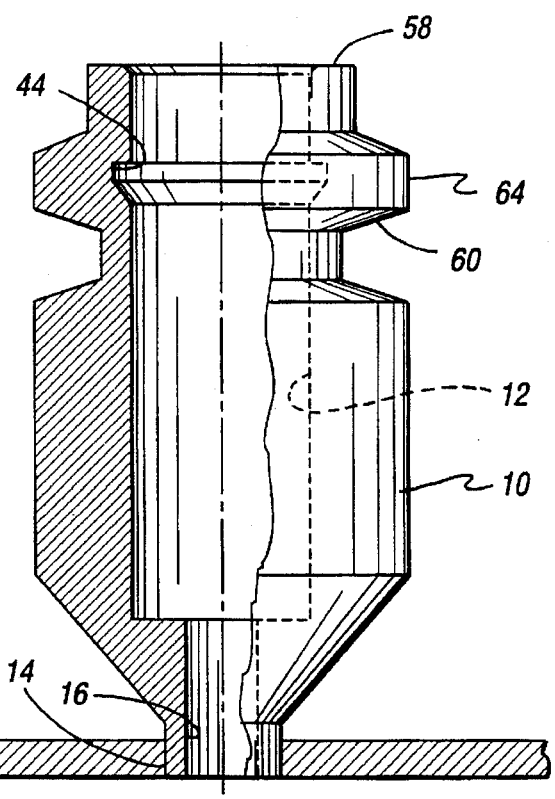
Fig. 1

CHARGE VALVE ASSEMBLY

TECHNICAL FIELD

This invention relates to pressurized mechanical refrigeration systems for automotive vehicles.

BACKGROUND ART

In a pressurized mechanical refrigeration system, such as an automotive air conditioning system having a compressor, condenser and evaporator, it is necessary to provide valve assemblies for charging the system with refrigerant fluid following installation of the system at an automotive vehicle assembly or repair facility. Such valve assemblies used in prior art systems often have intricate, multiple-piece elements, such as a valve stem, that inherently are costly to manufacture or that have limitations with respect to durability.

It is desirable in high production volume assembly plants to eliminate as much as possible the need for threads in the valve assembly in order to simplify machining, which reduces assembly costs and piece cost. Cost of prior art valve assemblies could be reduced further if the need for using an intricately machined one-piece valve stem or a multiple-piece valve stem could be eliminated. It is important also in the design of such systems to provide a charge flow passage that is capable of high fluid flow in order to reduce evacuation and/or fill time.

Typically, charge valves for use in pressurized mechanical refrigerant systems for automotive vehicles have a valve stem that is formed in two parts—a base part that can be secured to the system housing, and a companion part that is threadably secured to the base part. The companion part of the stem can be one of either two types. The first type uses an independent valve core which threads into the base part. The second type contains a flow valve mechanism that can be retained within the valve stem mechanically. The companion valve stem is then threaded to the base part, thus forming a complete valve stem assembly. The valve stem also can be threaded, either internally or externally, to receive a cap that protects the valve following the filling of the refrigerant system. The cartridge valve and the valve stem with which it registers must be carefully machined to maintain concentricity and close dimensional tolerances. Any additional machining requirement to add threads will further increase the cost of the valve assembly and increase assembly time. It also is necessary to carefully control the magnitude of the torque applied to threaded elements of the assembly in order to protect the system's integrity.

U.S. Pat. No. 5,205,531 discloses an example of a prior art valve design for use with a solenoid actuator. That design includes a unitary valve stem that can be received threadably in a housing, such as an automotive transmission housing. The unitary stem receives a movable poppet valve 32 which seats on an internal valve seat machined in housing port end 22. Movable plunger 52 is slidably received in the valve stem. A plug or stop 60 is threadably received in the open end of the valve stem. This construction, as in the case of other prior art designs, requires careful machining to maintain concentricity between the critical dimensions required by the popper valve and the plunger and to maintain concentricity and alignment of the counterbore 44 in the poppet valve with respect to the counterbore 24 in the base of the valve stem.

SUMMARY OF THE INVENTION

The improved assembly of our invention eliminates the disadvantages of prior art designs such as those described above. It includes a one-piece valve stem that does not require internal or external retainer threads. Neither does it require threading of a valve cartridge within the valve stem. Further, a protective cap for the valve assembly can be secured to the valve stem and subsequently removed following the pressure filling of the hydraulic system without risking failure of the connection of the valve stem with the housing.

According to one embodiment of our invention, the cap may be secured to the valve stem by a simple snap-action that requires no threading on the valve stem or on the cap itself.

A valve cartridge that is received within the valve stem is sealed by simple O-rings at axially spaced locations in the valve assembly. The cartridge is secured in place by using a simple retainer clip, such as a C-clip, secured in a retainer groove machined in the internal cavity of the one-piece valve stem.

BRIEF DESCRIPTION OF THE DRAWINGS

FIG. 1 is a view in elevation showing a valve stem for use with the valve assembly of our invention;

FIG. 2 is a cross-sectional view of a valve cartridge that can be assembled in the valve stem of FIG. 1;

FIG. 3b is an end view of the C-clip retainer shown in FIG. 3a;

FIG. 4a is a cross-sectional view of a valve cap that can be secured by means of a snap-on retaining ridge, which is received in a snap-ring groove formed on the valve stem of FIG. 1;

FIG. 4b shows a cross-sectional of a second alternate cap design in which internal threads in the cap are used to retain the cap on the valve stem rather than the snap-on mechanism illustrated in FIG. 4a;

FIG. 4d is a view of the valve cap shown in FIG. 4a, as seen from the plane of section line 4d-4d of FIG. 4a, illustrating notches in the margin of the valve cap of FIG. 4a.

PARTICULAR DESCRIPTION OF THE INVENTION

Figure 3A:
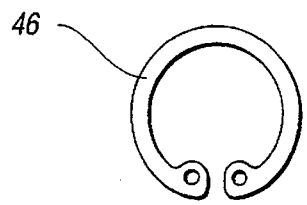
FIG. 3a is a C-clip that is used to retain the valve cartridge of FIG. 2 in the valve stem of FIG. 1.

FIG. 1 shows a valve stem 10 that can be machined from cylindrical metal stock. It is provided with a large diameter central bore 12 and a base portion 14 which can be formed of any desired diameter, such as the reduced diameter illustrated in FIG. 1. The bore 12 communicates with a pressurized fluid delivery passage 16 for transferring pressurized fluid to the interior of a housing for an automotive air conditioning component or other pressurized applications, generally designated by reference character 18. The base portion 14 can be brazed or press-fitted, for example, in the housing 18.

A bore 12 defines a valve cavity adapted to receive a cartridge valve assembly 20. This valve assembly includes a cylindrical housing 22 having an internal bore 24. The upper end of the housing 22 is provided with a valve seat 26, which is engaged by popper valve 28. Valve 28 establishes one-way flow between the central bore 24 and an intake port 30 for the charge fluid.

Popper valve 28 is carried by valve stem 32, which in turn is anchored by a spring seat 34 secured in place in the bore 24 by an internal groove 36. Valve spring 38 acts on the popper valve 28 and is seated on spring seat 34.

O-ring grooves 40 and 42 are formed at axially spaced locations in the housing 22. They receive 0-rings, as indicated in FIG. 2, which are adapted to seal against the internal cylindrical wall of the bore 12.

The upper end of the bore 12 is provided with a C-clip retainer groove 44, which is adapted to receive a C-clip retainer 46 as illustrated in FIGS. 3a and 3b. After the cartridge valve assembly 20 is assembled in place in the bore 12, the C-clip retainer 46 is inserted, using a conventional tool, into the bore 12 and snapped into place in the groove 44, thereby retaining the cartridge valve assembly.

A valve cap of the type shown in FIG. 4a is assembled on the upper end of the valve stem. It includes a cylindrical body 50 having at its lower margin a retainer ridge 52, as shown in FIG. 4a. It is provided with an internal boss 54. A compression-type flexible seal 56 is received in the base of the cap. When the cap is applied to the stem 10, the seal 56 engages sealing surface 58 on the upper end of the valve stem.

As the cap shown in FIG. 4a is moved into place, the ridge 52 snaps into an external groove 60 formed on the exterior of the valve stem. The inner cylindrical surface of the cap, as shown at 62, engages the outer cylindrical portion 64 of the valve stem after the cap is assembled in place.

The pull tab 66 can be provided on the cap, as indicated in FIG. 4a, to facilitate removal of the cap after it is snapped into place with the ridge 52 in the retainer grooves 60. Some small vertical grooves or notches 90 in the ridge 52 may be required to help facilitate cap removal. These are best seen in FIG. 4a and 4d. As seen in FIG. 4d, the notches 90 will facilitate flexing along a flexure line shown in FIG. 4d at 90'.

Figure 4B:
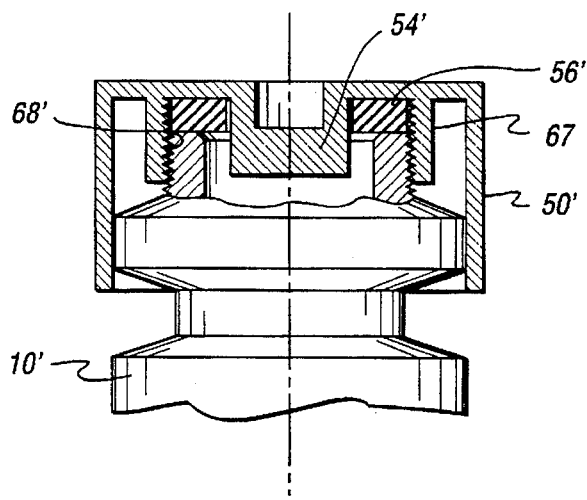

FIG. 4b shows a modified cap design. It includes internal threads 68 in cylindrical boss 67 formed within cylindrical cap housing 50'. These threads are adapted to threadably engage external threads formed on the upper end of the valve stem if the cap design of FIG. 4b is chosen rather than the snap-on design of FIG. 4a.

Figure 4C:
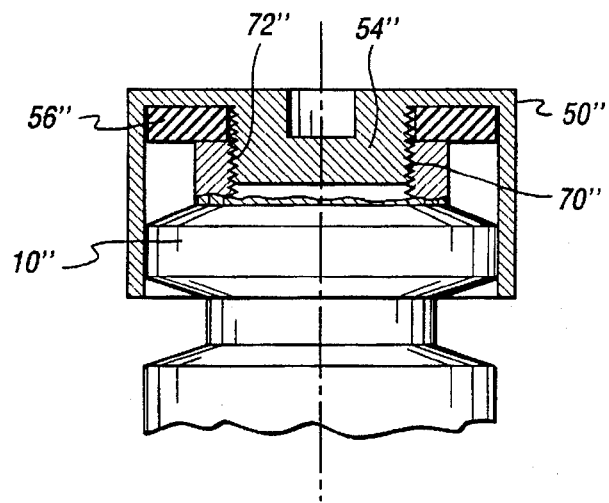
FIG. 4c shows an alternative design of the valve cap which includes external threads formed on an internal boss formed on the valve cap which threadably engage internal threads in the valve stem.
Figure 4B:
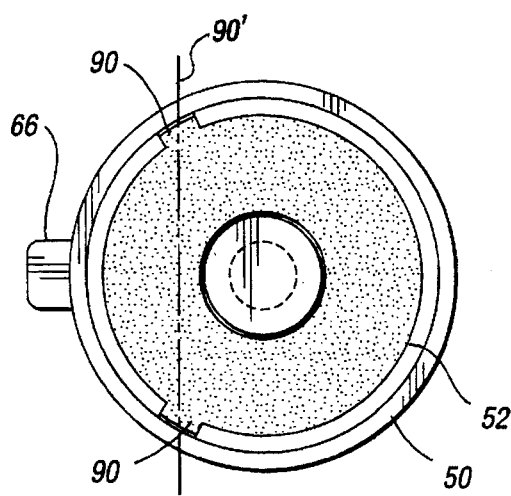

FIG. 4c shows a second alternate cap design which includes external threads 70 formed on a cylindrical boss 54". These threads are adapted to threadably engage internal threads 72 formed at the upper end of the valve stem if the cap design of FIG. 4c is chosen rather than the snap-on cap design of FIG. 4a.

In FIG. 4b, the elements of the cap that have counterparts in the design of FIG. 4a have been indicated by prime numerals. In the design of FIG. 4c, the elements that have counterparts in the design of FIG. 4a have been indicated by double prime numerals.

Applicants' improved design has many advantages over prior art designs such as those discussed above. These include reduced machining complexity of the internal valve stem and external surface of the valve core. It also allows the use of a single piece stem in high-flow type cartridge valves. This reduces machining costs. It reduces also assembly costs when the valve is installed.

Our improved design also eliminates the need for monitoring valve core torques and valve stem torques during assembly because of the elimination of the threaded connections at the valve stem and at the valve core elements of the cartridge valve assembly. When the charge cap is removed, unwanted detachment of the valve stem is prevented. If the snap-on-type valve cap is chosen, there is no need for machining threads on the valve stem or in the cap itself, thereby further reducing the manufacturing and assembly costs.

The valve stem makes it possible during assembly of the valve to have a quick fill-time, as well as a quick evacuation time, because of the large internal flow capacity of the bores in the valve stem. A poppet-type valve of the kind illustrated in FIG. 2 will allow a larger internal flow diameter than prior art cartridge valve designs, such as the well known Schrader valve design. Reduced fill-time, of course, still further reduces labor costs involved in filling the pressurized system with charge fluid in the final assembly plant.

Having described preferred embodiments of our invention, what we claim and desired to secure by U.S. Letters Patent is:

What is claimed is:

1. A charge valve assembly for use in charging a pressurized mechanical refrigeration system in an automotive vehicle comprising:

a single piece valve stem having an opening with a cylindrical inner wall therein, an outlet flow passage at one end of said valve stem opening;

means for securing said one valve stem end to a housing for said mechanical refrigeration system;

an inlet flow opening at the other end of said valve stem opening;

a cartridge valve assembly located in said valve stem opening, said cartridge valve assembly having a cylindrical housing with an inner valve flow passage;

circular sealing elements between said cylindrical housing and said inner wall; and a valve cap secured on said valve stem including a seal member engageable with an adjacent seal surface at said other end of said valve stem opening.

2. The assembly of claim 1 wherein said circular sealing elements comprise spaced O-ring seals, and seal ring grooves in said cartridge valve assembly housing receiving said seals, thereby effecting a hydraulic seal between said cartridge valve assembly housing and said inner wall.

3. The assembly as set forth in claim 2 wherein said valve cap comprises a cylindrical body extending over said other valve stem opening, a retainer ridge on said cylindrical body and a retainer groove in said valve stem adapted to receive said retainer ridge.

4. The assembly as set forth in claim 2 wherein said valve cap includes internal retainer threads, and external threads on said valve stem engageable with said internal retainer threads.

5. The assembly as set forth in claim 2 wherein said valve cap includes external retainer threads, and internal threads in said valve stem engageable with said external retainer threads.

6. The charge valve assembly as set forth in claim 1 wherein said cartridge valve assembly includes a one-way flow valve element, a valve seat engageable by said flow valve element in said valve flow passage, and means for retaining said cartridge valve assembly in said valve stem opening.

7. The assembly as set forth in claim 6 wherein said circular sealing elements comprise spaced O-ring seals, and seal ring grooves in said cartridge valve assembly housing receiving said seals, thereby effecting a hydraulic seal between said cartridge valve assembly housing and said inner wall.

8. The assembly as set forth in claim 6 wherein said means for retaining said cartridge valve assembly comprises a C-clip retainer ring and a retainer groove formed in said valve stem opening adjacent one end of said cartridge valve assembly housing.

\* \* \* \* \*